July 7, 1970

L. A. BIXBY 3,518,897

REDUCTION GEARING ASSEMBLY

Filed Oct. 28, 1968

INVENTOR.
LEO A. BIXBY
BY
Stranch, Nolan, Neale, Nies & Kurz
ATTORNEYS

July 7, 1970  L. A. BIXBY  3,518,897
REDUCTION GEARING ASSEMBLY
Filed Oct. 28, 1968  5 Sheets-Sheet 3

INVENTOR.
LEO A. BIXBY
BY
ATTORNEYS

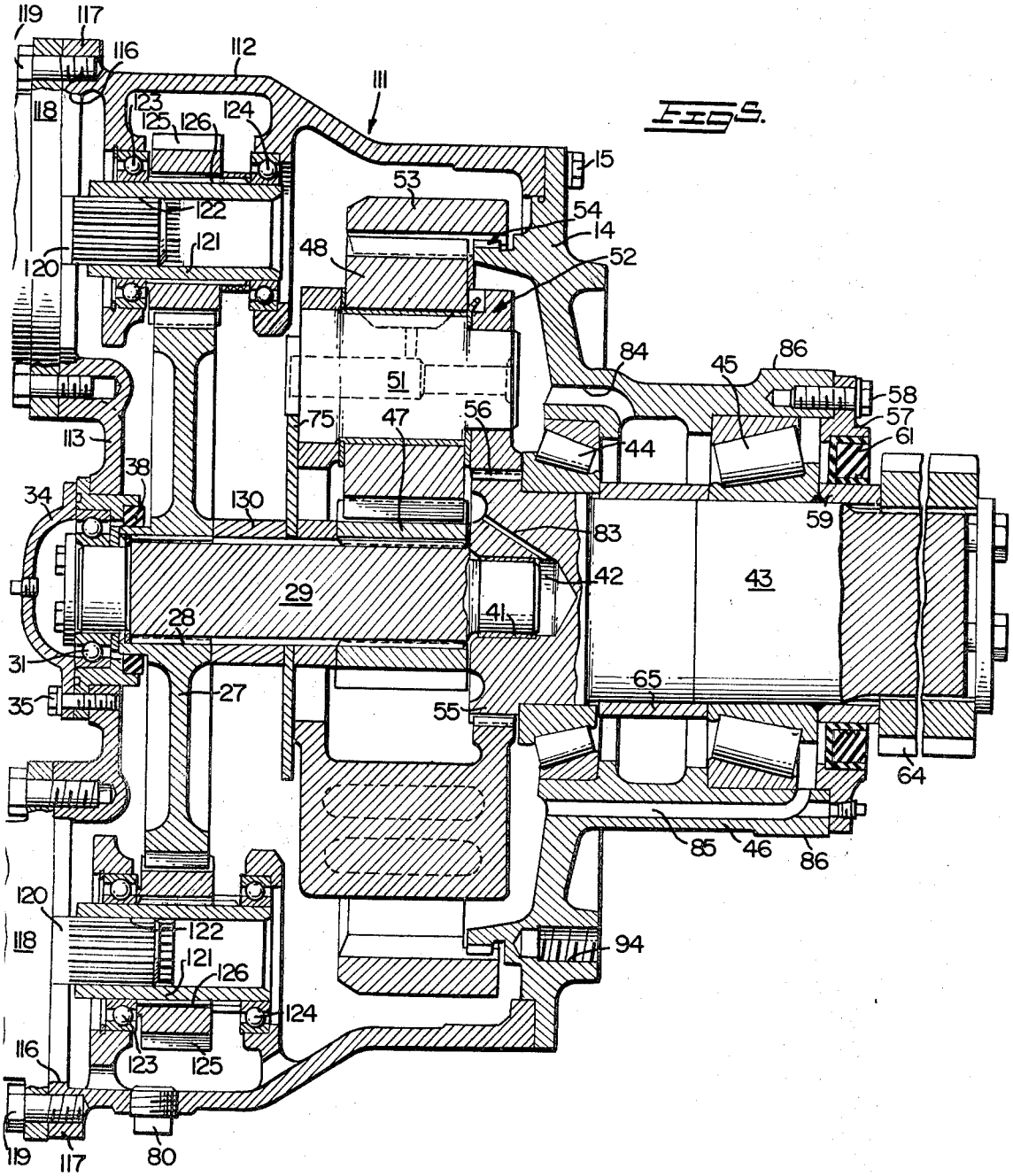

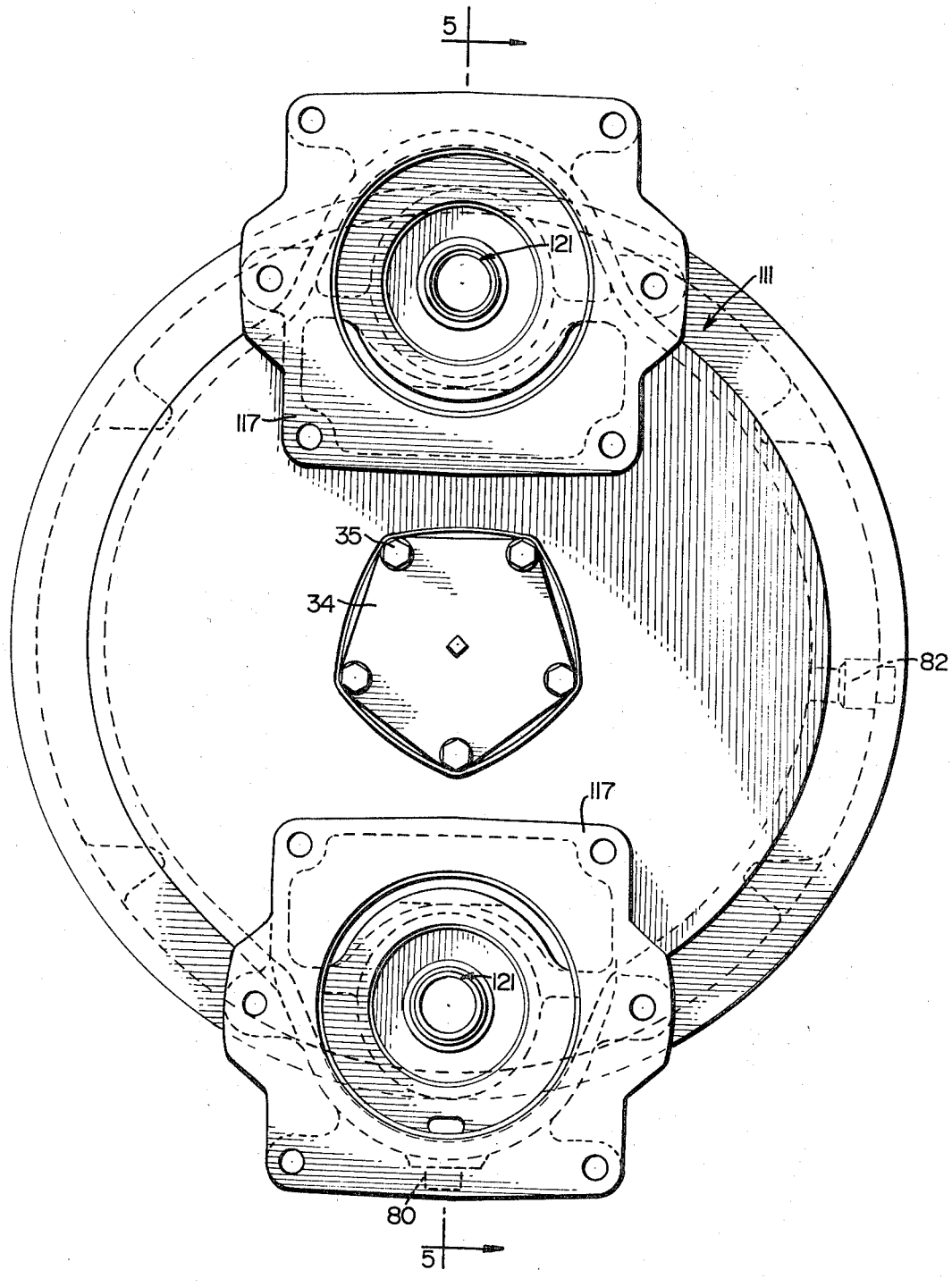

United States Patent Office 3,518,897
Patented July 7, 1970

3,518,897
REDUCTION GEARING ASSEMBLY
Leo A. Bixby, Niles, Mich., assignor, by mesne assignments, to Rockwell-Standard Company, Pittsburgh, Pa., a corporation of Delaware
Filed Oct. 28, 1968, Ser. No. 771,118
Int. Cl. F16h *1/28, 37/06*
U.S. Cl. 74—661                                    10 Claims

ABSTRACT OF THE DISCLOSURE

A compact universally positionable double reduction spur-planet reduction gearing assembly provides an auxiliary drive system between one or more hydraulic motors and a device to be driven such as a winch, turntable, backhoe, coal boring equipment and the like. The assembly comprises a spur gear combination set consisting of a relatively small pinion driving a much larger bull gear, in series with a planet reduction gear set consisting of an axially and radially floating ring gear and an axially and radially floating planet gear carrier, both gear sets being capable of a wide variation in relative gear size for optimum drive ratio flexibility. The gearing is mounted in a two-part housing with the ring gear of the planetary set splined upon the housing part in which the output shaft is rotatably supported and the planet carrier splined on the output shaft. The assembly is adapted to be mounted in various positions, with provision for oil filling, draining and sealing in all of them. The assembly housing has a pilot fit into the housing of the device it drives and the housings are rigidly connected by a row of bolts located for optimum torque reaction absorption.

BACKGROUND AND SUMMARY OF INVENTION

The invention relates to the provision of a compact efficient reduction drive gearing with a wide choice of gear ratios between one or more motors and a device to be driven such as a winch, crawler tracks and the like wherein considerable torque is involved at the output shaft. The invention contemplates an input spur gear set wherein a pinion drives a relatively large bull gear and in series therewith a planetary gear set drive connected to the output shaft. The housing containing the gear sets also supports the motor or motors, and where a plurality of motors is employed they are connected to individual pinions driving the common bull gear.

The gearing art suggests many combinations of motor driven spur gear and planetary gear associations especially in vehicle wheel drives such as disclosed in Lee et al. Pat. No. 2,258,328, and also suggests direct hydraulic motor drives to reduction gear as disclosed in Blenkle Pat. No. 3,090,456.

The invention departs from such prior suggestions by providing for the first time a novel compact assembly of reduction gearing wherein an input pinion drives a bull gear in series with a planet gear set driving the output shaft, all being specially disposed in a cooperating housing structure and there being a wide choice of gear ratios for optimum flexibility. The bull gear is driven by a single input pinion coupled to a hydraulic motor in an embodiment, and by a plurality of input pinions coupled to individual hydraulic motors in an embodiment wherein higher output torque is required. By providing a multiple motor driven input for the bull gear, higher torque output may be obtained without increasing the spur gear widths and at the same time a balanced load is applied to the bull gear and this reduces lubrication problems and wear. It is the object of the invention to provide the foregoing and particularly the special housing, shaft and gear constructions which are recited in certain of the claims.

BRIEF DESCRIPTION OF DRAWINGS

FIG. 5 is another sectional view showing a reduction gear assembly similar to FIG. 1 and taken substantially on line 5—5 of FIG. 6 having two inputs driven by separate hydraulic motors; and FIG. 6 is an input end view of the assembly of FIG. 5.

PREFERRED EMBODIMENTS OF INVENTION

Figure 1:
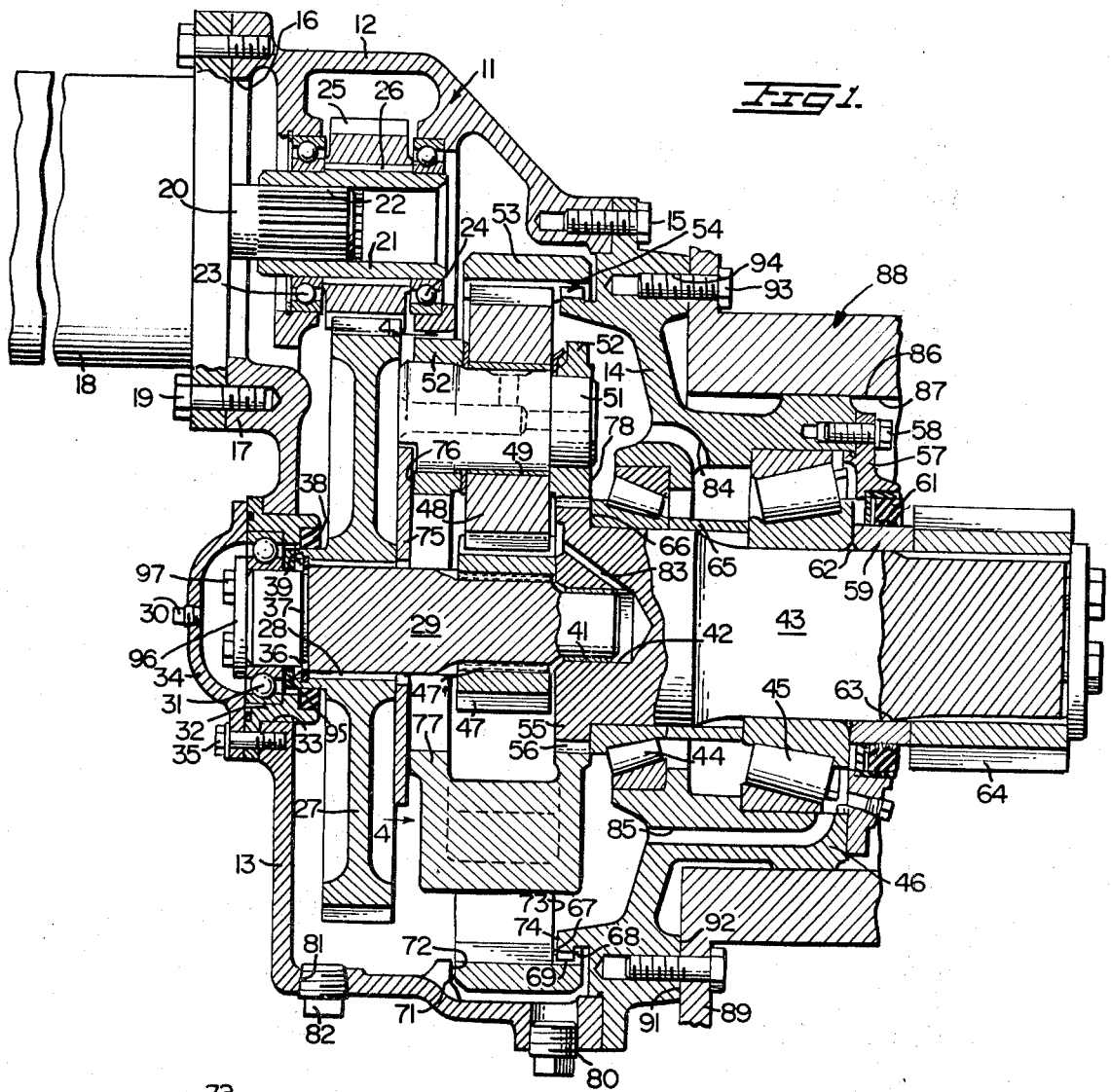
FIG. 1 is a sectional view substantially on line 1—1 of FIG. 2 showing a reduction gearing assembly according to a preferred embodiment of the invention.

Referring to FIGS. 1–4, reduction gearing is enclosed within a housing 11 comprising a main housing member 12 having an integral side wall 13 and its other side open. A removable housing member 14 comprises the other side wall of the housing and is secured to member 12 as by a series of peripherally disposed bolts 15.

Wall 13 has an opening 16 surrounded by a flange 17, and a hydraulic motor 18 is attached to the housing as by bolts 19 so that its output shaft 20 extends through opening 16 into the hollow shaft 21.

Motor shaft 20 is non-rotatably secured to shaft 21 as by a splined connection 22. Shaft 21 is rotatably mounted coaxial with shaft 20 by ball bearing assemblies 23 and 24 disposed in the main housing member. A spur pinion 25 is non-rotatably secured as by splines 26 to shaft 21.

Pinion 25 is meshed with a larger diameter bull gear 27 non-rotatably splined at 28 upon an intermediate shaft 29 which has one end rotatably mounted in the main housing member by ball bearing assembly 31 carried by a retainer ring 32 piloted within a side wall opening 33. A cap 34 extends over the exposed end of the bearing 31, and bolts 35 secure the cap and retainer ring 32 to side wall 13, thus securing bearing 31 against axial movement. A snap ring 36 is seated in an internal groove 37 in hub 39, and a spacer washer 95 is located between the end of hub 39 and the inner race of bearing 31. Abutting the opposite side of the inner race of bearing 31 is a retainer washer 96, which is attached to the end of shaft 29 by two or more capscrews 97, thus clamping bearing 31, spacer washer 95 and gear hub 39 tightly together to prevent axial movement of gear 27 and shaft 29, and to form an oil-tight joint between them. When required (as in a vertical mounting), an annular oil seal assembly 38 may be disposed between retainer ring 32 and the relatively rotatable hub 39 of gear 27 to retain the lubricant which is introduced into cap 34 at fitting 30 to lubricate bearing 31.

Shaft 29 has its other end coaxially journalled by a sleeve bushing 41 within a recess 42 in the inner end of a an output shaft 43. Shaft 43 is rotatably mounted by tapered roller bearing assemblies 44 and 45 in removable housing member 14, the latter bearing assembly being the larger and disposed at the outer end of a hollow boss projection 46 of housing member 14.

A sun gear 47 is non-rotatably mounted on shaft 29 inwardly of shaft 43 as by a splined connection 47'. Sun gear 47 meshes with a plurality of planet gears 48 (only one shown in FIG. 1) journalled by bushings 49 on pins 51 press fitted rigidly into a planet carrier 52, and planet gears 48 are all meshed with a relatively stationary internal ring gear 53 that is non-rotatably mounted on housing member 14 by a longitudinal spline connection indicated at 54. While three planets are here disclosed (FIG. 4) other numbers may be used if desired. Carrier 52 is non-rotatably mounted on the inner enlarged end 55 of output shaft 43 by a longitudinal spline connection indicated at 56. The spline connection 54 provides for both axial and radial float of the ring gear 53, and the spline connection at 56 provides for axial and radial float of carrier 52, as will be later described in more detail.

At the outer end of boss 46, an annular member 57 is secured upon housing member 14 as by a series of bolts 58. An annulus 59 of hard metal is press fitted non-rotatably onto shaft 43 in end abutment with the inner race of bearing 45, and an oil seal assembly 61 is mounted on member 57 to sealingly surround and engage the smooth periphery of annulus 59. A resilient seal ring 62 is compressed between shaft 43, annulus 59 and the bearing race.

Output shaft 43 projects from the housing 11 at seal 61, and is formed with a longitudinally splined section 63 on which is adapted to be mounted a gear 64, which for example may comprise part of a further drive reduction gearing in a ground engaging vehicle wheel.

A rigid spacer collar 65 surrounds shaft 43 between the inner races of bearings 44 and 45, and the inner end of the inner race of bearing 44 abuts a shoulder 66 on shaft 43. The bearings and shaft 43 are thus mounted in axially fixed relation.

Figure 1A:
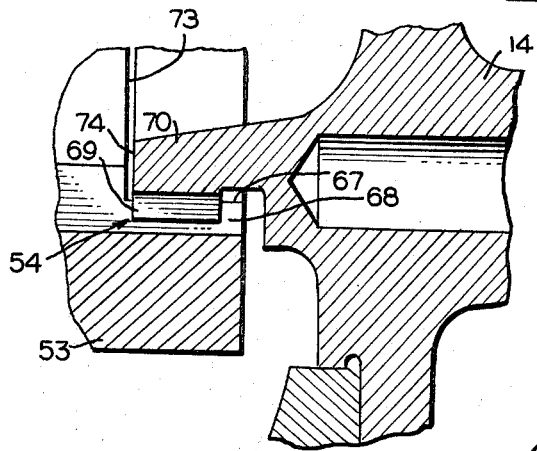
FIG. 1A is an enlarged fragmentary section showing the floating mount of the ring gear on the housing.

Referring to FIG. 1A, the right ends of the internal gear teeth are cut away to effectively form a notch 67 at the bottom of which are the longitudinally extending tooth portions 68 which serve as splines meshed with the row of splines 69 extending from an inwardly projecting boss 70 on housing member 14. It will be seen that splines 69 do not extend to the bottom of the space between the tooth portions and so ring gear 53 has a limited amount of radial float.

Ring gear 53 also has a limited amount of axial float, movement in one direction being limited by engagement of the gear side 71 with a fixed flat surface 72 in main housing member 12, and movement in the other direction being limited by engagement of gear side 73 with the flat end surface 74 of boss 70.

Figure 4:
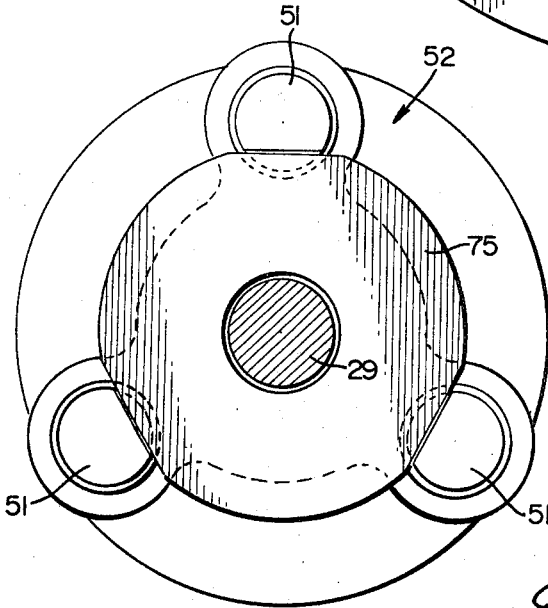
FIG. 4 is a fragmentary section showing the end abutment washer for the carrier in the assembly.

A flat sided annular washer 75 surrounds shaft 29, being supported on cutaway portions of carrier pins 51 as shown in FIG. 4, and washer 75 acts as a stop to limit axial float of planetary carrier 52 to the left in FIG. 1 when the flat end face 76 of the carrier hub 77 abuts the washer. Axial float of carrier 52 in the other direction is limited by abutment of flat side surface 78 of the carrier against the inner fixed race of bearing 44.

The axially and radially floating splined connection between the ring gear 53 and the housing side member 14 thus coaxially surrounds the axially floating connection between the carrier and the output shaft which is mounted for rotation on the side member 14, and this compact arrangement provides for reduced wear in operation.

Gears 25, 27, 47, 48, and 63 and shafts 21, 29, and 43 all rotate on parallel axes.

Figure 2:
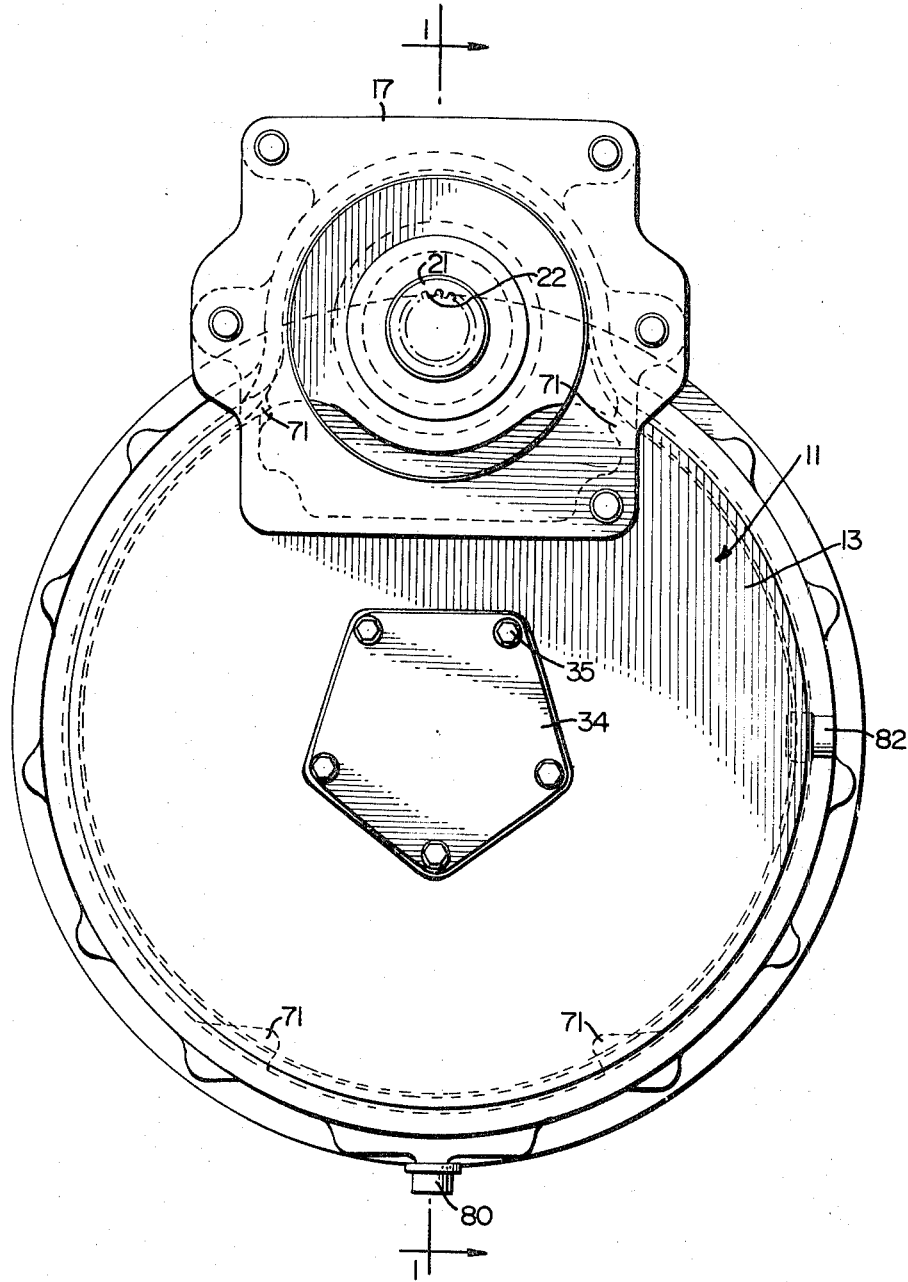
FIG. 2 is an end view of the reduction gearing assembly as viewed from the left or input end of FIG. 1, the hydraulic motor not being shown.
Figure 3:
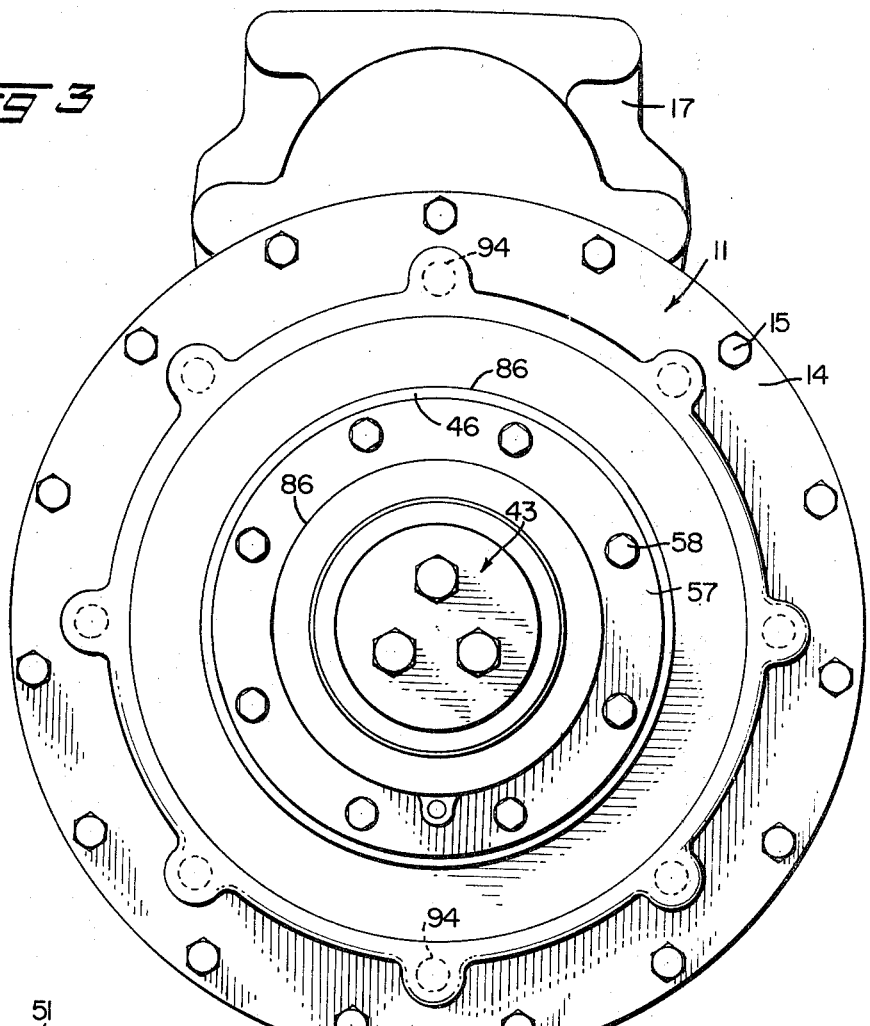
FIG. 3 is an opposite or output end view of the reduction gearing assembly, the mechanism housing not being shown.

In operation the interior of housing 11 is filled to a suitable level with a liquid lubricant such as oil usually through the opening 81 shown 90° out of place in FIG. 1 but in place in FIG. 2 and normally closed by plug 82. A drain plug is shown at 80. Rotation of the gears distributes the oil within the housing to lubricate the various bearings and bushings. Oil from the housing interior is conveyed by passage 83 in shift 43 to recess 42 to lubricate bushing 41, and oil from the housing interior is conveyed by passages 84 and 85 into boss 46 to insure full lubrication of the output shaft bearings.

A cylindrical surface 86 accurately coaxial with shaft 43 is formed on the periphery of boss 46, and this surface 86 pilots the gear reduction housing 11 to fit within a bore 87 in a housing 88 containing the mechanism to be driven from shaft 43. The mechanism housing has an end flange 89 having a flat annular face 91 perpendicular to the axis of surface 86 and smoothly seating on the corresponding flat annular end face 92 on housing side member 14 which is located on a much larger radius than boss 46, whereby, when attachment bolts 93 inserted into threaded holes 94 are drawn tight, the gear reduction and mechanism housings are assembled in accurately coaxial relation, and torque reactions developed in the mechanism housing are transmitted directly to the relatively strong connection to the gear reduction housing 11.

In a specific application of the invention gears 25 and 27 have twenty-four (24) and seventy-two (72) teeth respectively, sun gear 47 has fifteen (15) teeth, planet gears 48 each have twenty-four (24) teeth and ring gear 53 has sixty-three (63) teeth. Any suitable gear ratios can be selected according to the invention to suit various drive requirements.

In the embodiment shown in FIGS. 5 and 6 the housing 111 comprises a main housing member 112 having an integral side wall 113, and the other side is closed as in FIG. 1 by housing member 14 secured thereto by bolts 15. Housing member 112 is the same as housing member 12 of FIG. 1 except that there are two openings 116 bordered by flanges 117. In the illustrated embodiment these openings and flanges are identical and spaced 180° apart on a vertical centerline.

Hydraulic motors 118 are secured to flanges 117 as by bolts 119. Motor shafts 120 are connected non-rotatably to hollow shafts 121 by splined connections 122. Ball bearing assemblies 123 and 124 rotatably support shafts 121 in the main housing member, and a spur gear pinion 125 is non-rotatably mounted on each shaft 121 as by a splined connection 126.

Shafts 121 are supported in internal main housing bosses with their centers disposed in a vertical plane containing intermediate shaft 29, and both gears 125 are of the same size and meshed with bull gear 27 so that input torque is delivered to gear 27 at circumferentially spaced points providing a balanced distribution of drive forces. While two input gears are shown in FIGS. 5 and 6, the invention contemplates three, four or more such inputs symmetrically arranged around the center of shaft 29 and all geared to gear 27.

Apart from the multiple input arrangement above described, the structural arrangements of FIGS. 5 and 6 are essentially the same as in FIGS. 1–4, corresponding parts being indicated by the same reference numerals. In both embodiments carrier 52 is mounted for limited axial and radial float, and ring gear 53 is mounted for both limited radial float and axial float. In FIG. 5 an axially rigid spacer collar 130 extends between washer 75 and the hub of gear 27.

The embodiment disclosed in FIGS. 1–4 may be proportioned to provide an output torque at shaft 43 of about 5,000 foot-pounds to 10,000 foot-pounds. Considerable flexibility is permitted by the choice of various gear ratios in both the spur gear set at 25, 27 and the planetary gear set. The arrangement however is basically the same throughout the foregoing range, and it provides a compact efficient gear box that lubricates itself in horizontal, vertical or intermediate installation positions.

For larger units, say in the 15,000 to 20,000 foot-pound output torque range, the single input arrangement shown in FIGS. 1–4 may not be practical, and in such event the invention contemplates the multiple input arrangement illustrated by FIGS. 5 and 6.

A major advantage of the multiple input arrangement of FIGS. 5 and 6 is that the first reduction particularly the spur gear reduction, does not require wide gears because the load is divided. The advantage of using narrow gears is appreciable because wide gears driven at the speeds usually involved generate considerable heat and adequate lubrication is difficult especially in differently oriented positions of the housing as may be required by space limitations in an installation. A further advantage arising from using the multiple inputs of FIGS. 5 and 6 is that the bearing sizes for the input gears 125 need not be increased over those used for the smaller torque single input embodiment because of the balanced distribution of input load. This reduces inventory and expense, as well as likelihood of bearing failures.

In all embodiments the output shaft 43 has a splined connection with carrier 52. This not only provides for the axial and radial float connection therebetween and less expensive manufacturing since a one-piece carrier and output shaft would be complex in making but it enables each to be made of a metal that is best suited to the function. For example, the carrier may be made of an inexpensive grade of steel, while shaft 43 can be made of a high grade steel alloy designed for resistance to the high stresses it encounters.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Drive mechanism comprising a housing, an input pinion gear rotatably mounted in the housing, an intermediate shaft rotatably mounted in said housing, a bull gear rigid with said intermediate shaft meshed with said input gear, an output shaft rotatably mounted in said housing coaxial with said intermediate shaft, a planet gear carrier non-rotatably mounted on said output shaft by means providing for both axial float and radial float of said carrier relative to said output shaft, a sun gear rigid with said intermediate shaft, and bull gear being appreciably larger than either said pinion gear or said sun gear, a plurality of planet gears rotatably mounted on said carrier and meshed with said sun gear, and an internal ring gear non-rotatably mounted on said housing by means providing for both axial float and radial float of said ring gear relative to said housing.

2. The drive mechanism defined in claim 1, wherein a plurality of input pinion gears of substantially the same size are rotatably mounted within said housing in circumferentially distributed arrangement around said bull gear and all of said pinion gears are meshed with said bull gear.

3. The drive mechanism defined in claim 1, wherein said housing comprises a side member wherein said output shaft is supported by bearing means, and said ring gear is non-rotatably mounted directly on said side member.

4. In the drive mechanism defined in claim 1, said housing comprising a main housing member and a detachably secured housing side member, bearings mounting said output shaft on said housing side member, said means providing for axial and radial float of said carrier comprising a splined connection between the inner end of said output shaft and said carrier, and said means providing for axial and radial float of said ring gear comprising a spline connection between said ring gear and said housing side member.

5. The drive mechanism defined in claim 1, wherein said housing comprises a main housing member wherein said input gear is mounted and wherein one end of said intermediate shaft is mounted, a housing side member secured on said main housing member, bearing means mounting said output shaft on said housing side member, bearing means rotatably mounting the inner end of said intermediate shaft on the inner end of said output shaft, and said ring gear being directly mounted on said housing side member.

6. In the drive mechanism defined in claim 1, said housing comprising a main housing member and a detachably secured housing side member having an internal hollow boss extending into said main housing member, and said ring gear having an internally splined portion mounted on external splines on said boss.

7. The drive mechanism defined in claim 1, wherein said carrier is splined upon an enlarged inner end section of said output shaft, and said intermediate shaft has its inner end coaxially journalled within said inner end section of the output shaft and its other end mounted on a bearing on a side wall of said housing.

8. The drive mechanism defined in claim 1, wherein a hydraulic motor is mounted on said housing with its output shaft directly drive connected to said input gear.

9. The drive mechanism defined in claim 2, wherein a plurality of hydraulic motors are mounted on said housing each drive connected to one of said pinions.

10. The drive mechanism defined in claim 1, wherein said housing has an accurately cylindrical surface surrounding the output shaft for pilot fit within a corresponding bore of a housing associated with a device to be driven by said output shaft, said housings have flat end surfaces in abutment in a plane at right angles to the axis of said cylindrical surface, and means disposed radially outwardly of said cylindrical surface is provided for securing said housings together in assembly.

References Cited

UNITED STATES PATENTS

| | | | |
|---|---|---|---|
| 2,583,140 | 1/1952 | Else | 74—801 |
| 2,759,376 | 8/1956 | Chamberlin et al. | 74—801 |
| 2,939,346 | 6/1960 | McCarthy et al. | 74—801 |

ROBERT M. WALKER, Primary Examiner

U.S. Cl. X.R.

74—801